(12) United States Patent
Chen et al.

(10) Patent No.: US 9,210,086 B2
(45) Date of Patent: Dec. 8, 2015

(54) TRANSMISSION SYSTEM CAPABLE OF DYNAMICALLY SETTING TRANSMISSION PROFILE AND ITS CONTROL METHOD

(71) Applicant: Prolific Technology INC., Taipei (TW)

(72) Inventors: Chiun-Shiu Chen, Hsinchu (TW); Wen-Jen Wu, Hsinchu (TW)

(73) Assignee: PROLIFIC TECHNOLOGY INC., Taipei (TW)

( * ) Notice: Subject to any disclaimer, the term of this patent is extended or adjusted under 35 U.S.C. 154(b) by 416 days.

(21) Appl. No.: 13/913,566

(22) Filed: Jun. 10, 2013

(65) Prior Publication Data

US 2013/0332556 A1    Dec. 12, 2013

Related U.S. Application Data (60) Provisional application No. 61/657,218, filed on Jun. 8, 2012.

(51) Int. Cl.
| | |
|---|---|
| *G06F 15/16* | (2006.01) |
| *H04L 12/801* | (2013.01) |
| *G06F 3/14* | (2006.01) |
| *G06F 9/44* | (2006.01) |
| *H04L 29/08* | (2006.01) |
| *H04L 29/06* | (2006.01) |
| *G09G 5/00* | (2006.01) |

(52) U.S. Cl.
CPC .............. *H04L 47/10* (2013.01); *G06F 3/1454* (2013.01); *G06F 9/4445* (2013.01); *H04L 65/80* (2013.01); *H04L 67/303* (2013.01); *G09G 5/005* (2013.01); *G09G 2340/0407* (2013.01); *G09G 2340/0435* (2013.01)

(58) Field of Classification Search
None
See application file for complete search history.

(56) References Cited

U.S. PATENT DOCUMENTS

| | | | |
|---|---|---|---|
| 8,990,405 B2* | 3/2015 | Popescu ................. | H04L 69/22 709/227 |
| 2009/0077249 A1* | 3/2009 | Chen ....................... | H04L 63/08 709/229 |
| 2010/0138476 A1* | 6/2010 | Gokaraju .............. | G06F 9/4445 709/203 |
| 2012/0083200 A1* | 4/2012 | Koh ....................... | G06F 1/3203 455/7 |
| 2013/0050392 A1* | 2/2013 | Chiang ............ | H04N 21/21805 348/14.01 |

* cited by examiner

*Primary Examiner* — Brian P Whipple
(74) *Attorney, Agent, or Firm* — WPAT, PC; Justin King (57) ABSTRACT

A transmission system for transmitting data between a controlling terminal and a controlled terminal is provided. The transmission system includes a first electronic apparatus, a second electronic apparatus and a transmission apparatus. The first and second electronic apparatus comprise first and second application programs, respectively. The transmission apparatus, coupled to the first and second electronic apparatus via first and second interfaces, respectively, determine one of the first and second electronic apparatuses as the controlling terminal and the other as the controlled terminal according to coupling sequences of the first and second electronic apparatuses. The first and second application programs determine an initial transmission profile according to respective feature information of the first and second electronic apparatuses detected, and continue to detect respective transmission utilization rates with the transmission apparatus and utilize the respective transmission utilization rates as reference for whether to dynamically adjust subsequent transmission profiles.

16 Claims, 5 Drawing Sheets

TRANSMISSION SYSTEM CAPABLE OF DYNAMICALLY SETTING TRANSMISSION PROFILE AND ITS CONTROL METHOD

FIELD OF THE INVENTION

The present invention relates to a communication technique, and more particularly, to a transmission system capable of dynamically setting a transmission profile and its control method.

BACKGROUND OF THE INVENTION

The remote desktop control technique is applied between two electronic apparatuses to achieve remote operations. Current remote desktop control tools, such as Virtual Network Computing (VNC), and Remote Desktop Connection (RDC) of Microsoft, need to first determine a controlling terminal and a controlled terminal. A server program is then executed on an electronic apparatus of the controlled terminal, and a client connection program is executed on an electronic apparatus of the controlling terminal to establish a connection with the server program. As such, the remote desktop control function can be achieved.

In a conventional method of remote desktop control between two electronic apparatuses via a transmission line, an application is executed on one of the electronic apparatuses to successively capture a snapshot of a desktop in a frame buffer. The snapshot is compressed or processed by other mechanisms for reducing the data amount, and then transmitted to another electronic apparatus via the transmission line. The processed snapshot is decompressed by an application of the electronic apparatus receiving the processed snapshot and displayed on a display screen. However, when transmitting image data using a transmission line, a sufficient bandwidth supporting the transmission cannot be guaranteed. In the event of another operation occupying the transmission bandwidth (e.g., a file copy operation), the image data transmission may be interfered or affected, resulting in issues such as image delay or lag that influences look-and-feel of a user towards the product.

SUMMARY OF THE INVENTION

It is an objective of the present disclosure to provide a transmission system capable of dynamically setting a transmission profile and its associated method which can automatically set an initial transmission profile and dynamically adjust a subsequent transmission profile.

It is another objective of the present disclosure to provide a transmission system capable of dynamically setting a transmission profile and its associated method such that a sufficient bandwidth for high priority transmission can be guaranteed.

To achieve the aforementioned objectives, a transmission system, for transmitting data between a controlling terminal and a controlled terminal is provided. The transmission system comprises: a first electronic apparatus and a second electronic apparatus, having a first application program and a second application program, respectively, for detecting respective corresponding feature information; and a transmission apparatus, coupled to the first electronic apparatus and the second electronic apparatus via a first interface and a second interface, respectively, configured to determine one of the first and second electronic apparatuses as the controlling terminal and the other as the controlled terminal according to respective coupling sequences of the transmission apparatus to the first and second electronic apparatuses; wherein, the first application program and the second application program determine an initial transmission profile for transmitting the data between the controlled terminal and the controlling terminal according to the feature information; the first application program and the second application program further continue to detect respective transmission utilization rates with the transmission apparatus, and utilize the transmission utilization rates as reference for whether to dynamically adjust a subsequent transmission profile for transmitting the data.

In addition, a control method for a transmission system to transmit data between a controlling terminal and a controlled terminal is provided. The transmission system comprises a first electronic apparatus, a second electronic apparatus and a transmission apparatus. The control method comprising the following steps of: (a) the transmission apparatus coupling to the first electronic apparatus and the second electronic apparatus via a first interface and a second interface, respectively, and determining one of the first and second electronic apparatus as the controlling terminal and the other as the controlled terminal according to respective coupling sequences of the transmission apparatus to the first and second electronic apparatuses; (b) detecting corresponding feature information of the first and second electronic apparatuses, respectively; (c) determining an initial transmission profile for transmitting the data between the controlled terminal and the controlling terminal according to the feature information; and (d) continuously detecting respective transmission utilization rates with the transmission apparatus, and utilizing the transmission utilization rates as reference for whether to dynamically adjust a subsequent transmission profile for transmitting the data.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION OF THE PREFERRED EMBODIMENT

Figure 1:
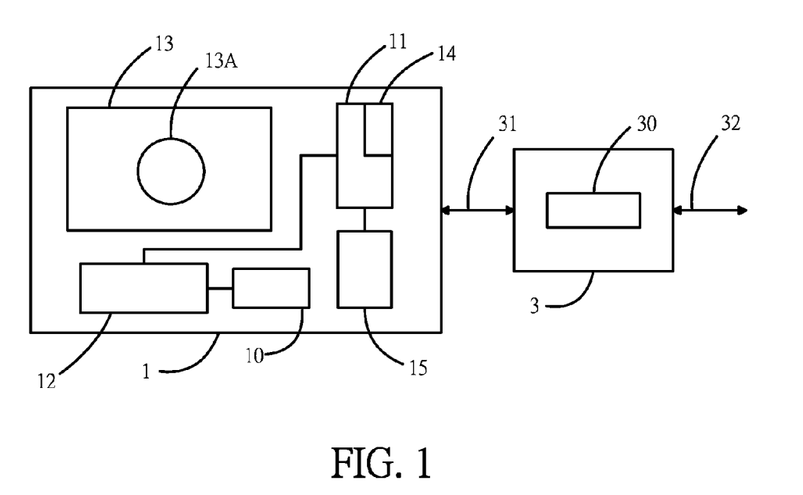
FIG. 1 is a schematic diagram of a transmission apparatus 3 connected to a first electronic apparatus 1 via a transmission interface 31.

A transmission apparatus 3 according to an embodiment of the present invention comprises a transmission controller 30 and two transmission interfaces 31 and 32. For example, the transmission interfaces 31 and 32 are hot-plug and plug-and-play transmission interfaces. Preferably, the transmission interfaces 31 and 32 are Universal Serial Bus (USB) interfaces. Referring to FIG. 1, the transmission apparatus 3 is connected to a first electronic apparatus 1 via the transmission interface 31. The first electronic apparatus 1 comprises a driver 10 and an application program 11. The driver 10 simulates a virtual display device 12 on the first electronic apparatus 1. The application program 11 transmits output data of the virtual display device 12 to the transmission controller 30 via the transmission interface 31. Alternately, the application program 11 receives the data transmitted via the transmission interface 32 from the transmission controller 30.

Figure 2:
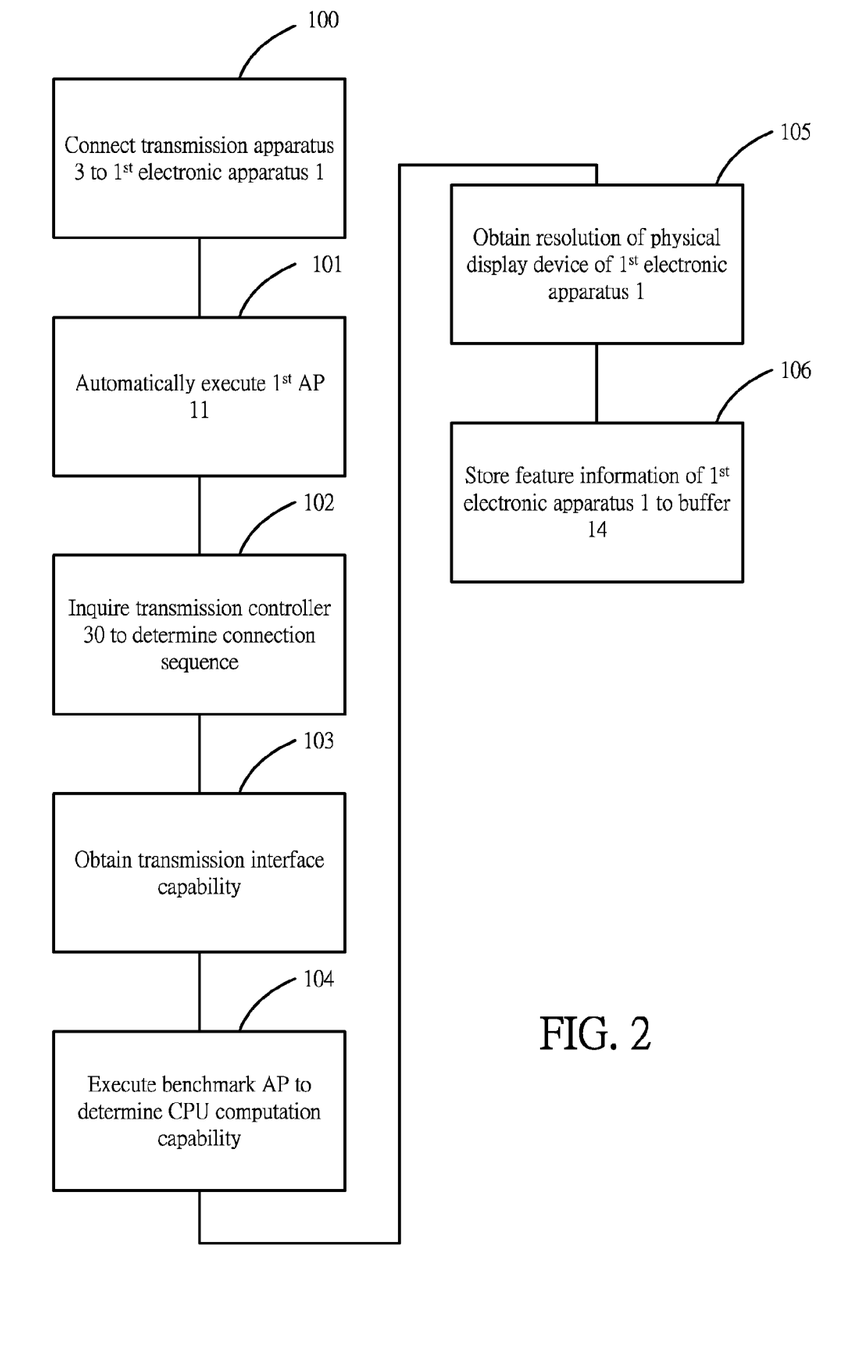
FIG. 2 is a flowchart of control process when a first electronic apparatus 1 is connected to a transmission apparatus 3.

FIG. 2 shows a flowchart of a control process when the first electronic apparatus 1 is connected to the transmission apparatus 3. In step 100, the transmission apparatus 3 having a hot-plug interface 31 is connected to the first electronic apparatus 1. In step 101, the first electronic apparatus 1 automatically executes the application program 11. In step 102, the first electronic apparatus 1 inquires the transmission controller 30 of the transmission apparatus 3 to determine a connection sequence, i.e., a sequence of connecting the electronic apparatus 1 and the electronic apparatus 2 to the transmission apparatus 3 is recorded in the transmission controller 30 to accordingly determine a controlling terminal and a controlled terminal. The process proceeds to steps 103, 104 and 105, to obtain a transmission interface capability and a CPU computation capability of the first electronic apparatus 1 and a resolution of a physical display device of the first electronic apparatus 1. In step 106, the transmission interface capability, the CPU computation capability and the resolution representing feature information of the first electronic apparatus 1 are stored to a first buffer 14.

Figure 3:
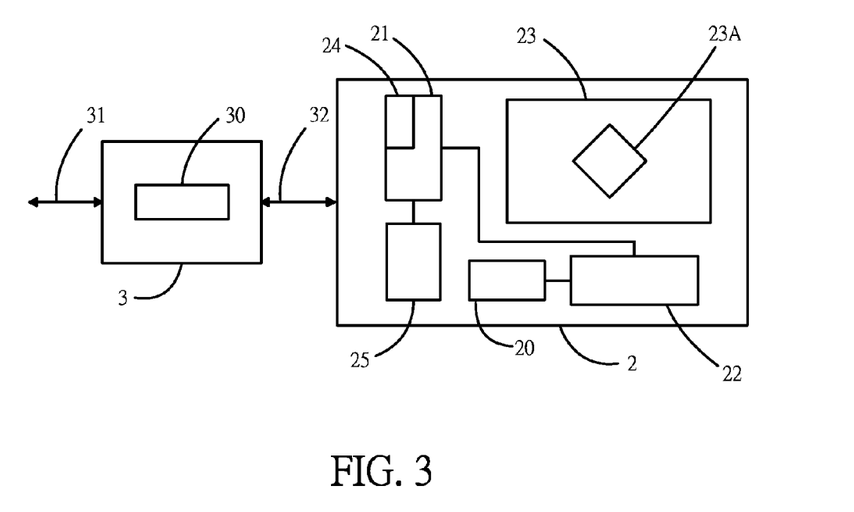
FIG. 3 is a schematic diagram of the transmission apparatus 3 connected to a second electronic apparatus 2 via a transmission interface 32.

FIG. 3 shows a schematic diagram of the transmission apparatus 3 connected to a second electronic apparatus 2 via a transmission interface 32. The second electronic apparatus 2 comprises a driver 20 and an application program 21. The driver 20 simulates a virtual display device 22. The application program 21 transmits output data of the virtual display device 22 to the transmission controller 30 via the transmission interface 32. Alternately, the application program 21 receives the data transmitted via the transmission interface 31 from the transmission controller 30.

Figure 4:
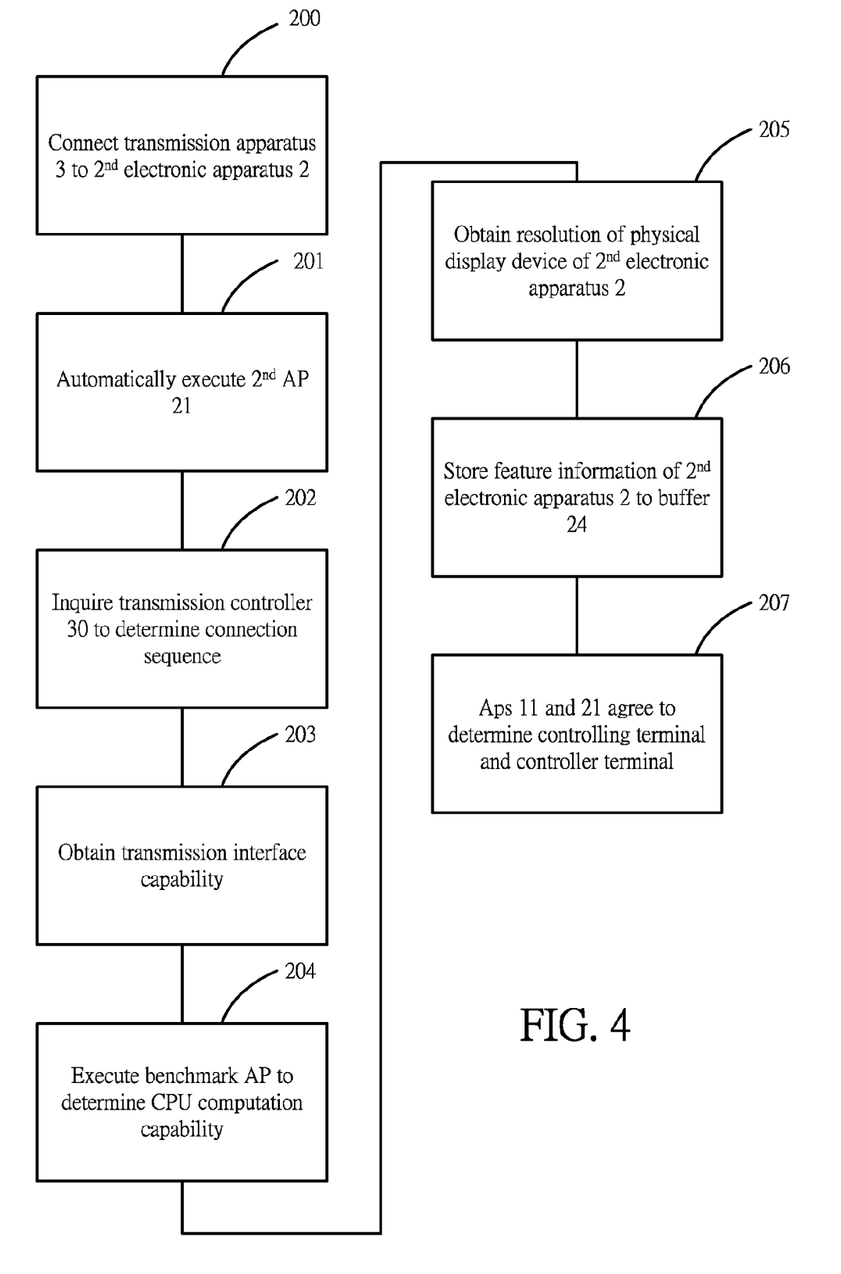
FIG. 4 is a flowchart of a control process when a second electronic apparatus 2 is connected to the transmission apparatus 3.

FIG. 4 shows a flowchart of a control process when the second electronic apparatus 2 is connected to the transmission apparatus 3. In step 200, the transmission apparatus 3 having a hot-plug interface 32 is connected to the second electronic apparatus 2. In step 201, the second electronic apparatus 2 automatically executes the application program 21. In step 202, the second electronic apparatus 2 inquires the transmission controller 30 of the transmission apparatus 3 to determine a connection sequence, i.e., a sequence of connecting the electronic apparatus 1 and the electronic apparatus 2 to the transmission apparatus 3 is recorded in the transmission controller 30 to accordingly determine a controlling terminal and a controlled terminal. The process proceeds to steps 203, 204 and 205, to obtain a transmission interface capability and a CPU computation capability of the second electronic apparatus 2 and a resolution of a physical display device of the first electronic apparatus 2. In step 206, the transmission interface capability, the CPU computation capability and the resolution representing feature information of the second electronic apparatus 2 are stored to a second buffer 24. In step 207, the application program 11 and the application program 21 determine with an agreement for a controlling terminal and a controlled terminal. In the embodiment, the first electronic apparatus 1 and the second electronic apparatus 2 are sequentially connected to the transmission apparatus 3. Thus, after performing the control processes in FIGS. 2 and 4 as well as the agreement reached by the application program 11 and the application program 21, the first electronic apparatus 1 is determined as the controlled terminal and the second electronic apparatus 2 is determined as the controlling terminal.

Figure 5:
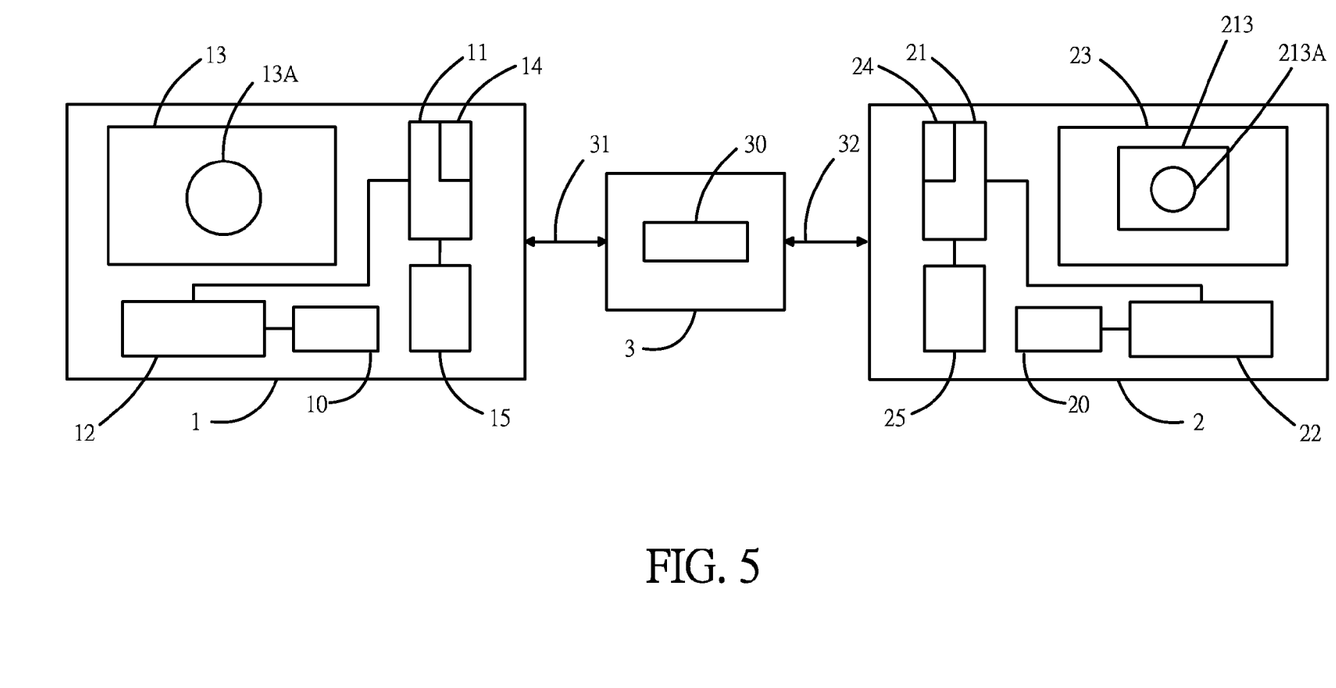
FIG. 5 is a schematic diagram of a transmission system using a transmission apparatus.

More specifically, according to the feature information of the first electronic apparatus 1 and the second electronic apparatus 2 stored in the first buffer 14 and the second buffer 24, respectively, the application programs 11 and 21 determine that the first electronic apparatus 1, by use of an initial transmission profile, transmits the output data from the virtual display device 12 of the first electronic apparatus 1 to the application program 21 via the transmission apparatus 3. Through the application program 21, a virtual display window 213 corresponding to a display image 13 of the first electronic apparatus 1 is presented in a display image 23 of the second electronic apparatus 2, so as to allow an actual human-man-interface (HMI) device 25 of the second electronic apparatus 2 to perform a window operation on the display image 23, as shown in FIG. 5.

Further, the transmission apparatus according to the embodiment of the present invention is capable of dynamically setting a transmission profile according to transmission conditions. At the first electronic apparatus 1, the application program 11 may periodically inquire the transmission controller 30 by a predetermined instruction packet, and determine a transmission utilization rate A of the transmission interface 31 according to a response time of the transmission controller 30. The transmission utilization rate A is stored in the buffer 14. Similarly, the application program 21 may also periodically inquire the transmission controller 30 by a predetermined instruction packet, and determine a transmission utilization rate B of the transmission interface 32 according to a response time of the transmission controller 30. The transmission utilization rate B is stored in the buffer 24. When determining the transmission utilization rate A or B, an average value of a predetermined period is preferably used to eliminate instantaneous discrepancy.

Figure 6:
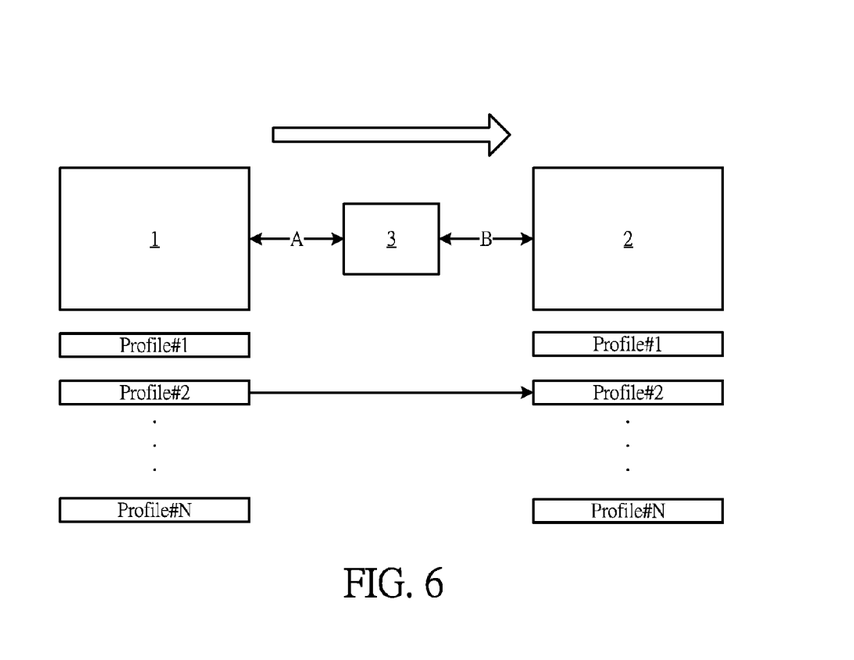
FIG. 6 is a schematic diagram of a transmission system, with an agreement, selecting Profile#2 for transmission.

In the embodiment, the application program 21 of the second electronic apparatus 2 serving as the controlling terminal is required to periodically communicate with the application program 11 of the first electronic apparatus 1, and to dynamically determine an overall transmission utilization rate according to the transmission utilization rates A and B. The overall utilization rate is a time coefficient of the transmission utilization rates A and B. A change in the transmission utilization rate within a specific period of time may cause a change in the agreed transmission profile of the application programs 11 and 21—details of such are to be described shortly. As shown in FIG. 6, the first electronic apparatus 1 and the second electronic apparatus 2 may perform transmission using various feasible transmission profiles, e.g., Profile#1, Profile#2, . . . , and Profile#N. By in real-time monitoring the transmission utilization rates A and B according to the agreement between the application programs 11 and 21, the overall transmission utilization rate can be determined to obtain automated transmission profile settings. FIG. 6 shows a schematic diagram of transmission performed on the basis of Profile#2 selected with an agreement.

Figure 7:
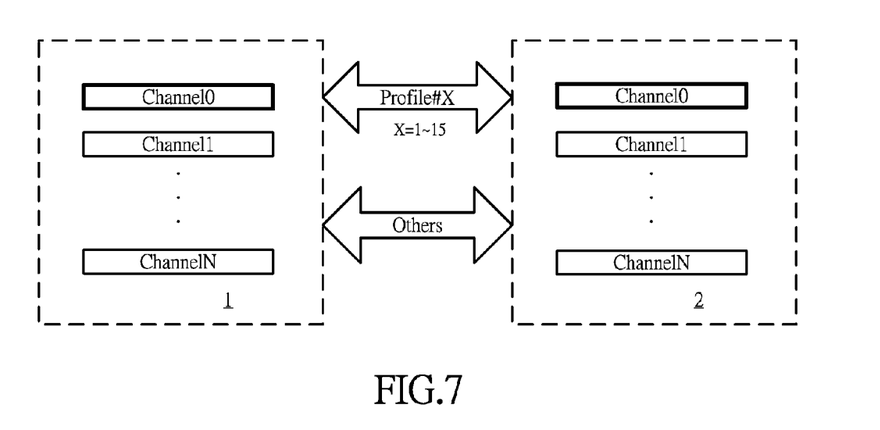
FIG. 7 is a schematic diagram of a transmission system dynamically adjusting a transmission profile wherein the image data are transmitted over the highest priority channel "Channel0."

In an embodiment, assuming that the transmission interfaces 31 and 32 of the transmission apparatus 3 are USB interfaces, different transmission channels may be designated according to types of transmission data (e.g., image transmission, file copying, communication protocol or data sharing). For example, the type of data transmitted above transmission profiles Profile#1, Profile#2, . . . , and Profile#N is mostly image data. To prevent the transmission operation of image data that greatly affects look-and-feel of a user from affecting or even interfering secondary transmission operations (e.g., file copying), the transmission profile associated with image transmission operations is designated with a transmission channel "Channel0" for transmitting data with a highest priority on the transmission interfaces 31 and 32. Other types of data are designated with transmission channels "Channel1" to "ChannelN," and are transmitted on a first-come-first-serve basis, as shown in FIG. 7.

Implementation details of the present invention are given below.

1. Auto-Determination on Control Method

Operation details of step 102 in FIG. 2 and step 202 in FIG. 4 are as given follows. In the above steps, the connection sequence and the control method of the application programs 11 and 21 inquiring the transmission controller 30 are determined. According to the transmission apparatus 3 comprising the transmission controller 30 and two plug-and-play transmission interfaces 31 and 32, assuming that the transmission interfaces 31 and 32 are USB interfaces, the first electronic apparatus 1 is a USB host when the transmission interface 31 is connected to the first electronic apparatus 1. Thus, the transmission controller 30 is activated, and a circuit associated with the transmission interface 31 is regarded as a USB device, on which an attach-device operation is then performed. The transmission controller 30 records the first electronic apparatus 1 as the first connected device into an internal memory of the transmission apparatus 3. When the transmission interface 32 is later connected to the second electronic apparatus 2, i.e., the second electronic apparatus 2 is also a USB host, the transmission controller 30 is similarly activated. As such, a circuit associated with the transmission interface 32 is also regarded as a USB device, on which another attach-device operation is performed. The transmission controller 30 records the second electronic apparatus 2 as the second connected device into the internal memory of the transmission apparatus 3. The application programs 11 and 21 then respectively inquire the transmission controller 30 to obtain the connection sequence, and reach an agreement for a controlling terminal and a controlled terminal. In other words, the controlling terminal and the controlled terminal are agreed according to a sequence of connecting to the transmission apparatus 3. In this example, the second electronic apparatus 2 is the controlling terminal, and the first electronic apparatus 1 is the controlled terminal.

2. Auto-Detection on Feature Information of Electronic Apparatuses

Details of steps 103 through 105 in FIG. 2 and steps 203 through 205 in FIG. 4 are given as follows. In the above steps, the application programs 11 and 21 automatically detect the feature information of the electronic apparatuses 1 and 2, and store the feature information into the buffers 14 and 24, respectively, so that the application program 21 (the controlling terminal) and the application program 11 (the controlled terminal) reach an agreement for an initial transmission profile with reference to the feature information. When the transmission interface 31 of the transmission apparatus 3 is connected to the first electronic apparatus 1, an event or an interrupt is generated to drive the application program 11 to activate the virtual display device 12, and to transmit the output image data to the transmission controller 30. After receiving the image data from the transmission controller 30, the application program 21 of the second electronic apparatus 2 presents the image data by the virtual display window 213 on the display image 23 of the second electronic apparatus 2. The above operations continue until the application programs 11 and 21 agree for a termination, or until a user forcibly terminates the operations with an instruction (e.g., a user closes the virtual display window 213 by operating a mouse).

There are three main factors influencing data transmission quality—1) the CPU computation capability of an electronic apparatus; 2) the transmission interface capability; and 3) the resolution of a physical display device of an electronic apparatus. The three factors above represent the feature information of an electronic apparatus, and can be detected through the methods below.

1) CPU computation capability: A benchmark program (e.g., BogoMIPS) is executed by an application program. The CPU computation capability is categorized into U0=low level, U1=medium level and U2=high level according to the benchmark value obtained. The CPU computation capability level is a factor for selecting the profile.

2) Transmission interface capability: As learned from an application program inquiring connection information of a system device of an operation system of an electronic device that, two USB modes, namely USB2.0 (480 Mb/s) and USB3.0 (5 Gb/s) (USB1.0 is not supported due to its slow speed at 12 Mb/s), are regarded as a factor for selecting the profile.

3) Resolution of physical display device: Similar to the above, a current setting value (e.g., WXGA=1366×768) of a desktop of the electronic apparatus is learned from an application program inquiring system information of an operating system of an electronic apparatus.

3. Transmission Profile Property

The initial transmission profile in FIG. 5 is a selected profile when the application programs 11 and 12 first start transmitting image data. The profile includes three properties—1) resolution; 2) frame rate; and 3) compression. The three properties above directly affect the amount of image data transmitted, and can be implemented by the methods below.

1) Resolution: Only one option is available if the resolution set for the display monitor of the controlled terminal (the first electronic apparatus 1) is selected. However, if the resolution set for the virtual display window 213 of the controlling terminal (the second electronic apparatus 2) is smaller, the resolution needs to be first downscaled (e.g., to ¼, or ¹⁄₁₆). If the resolution set for the virtual display window 213 of the controlling terminal (the second electronic apparatus 2) is larger or a full-screen is selected for display, the application program 22 of the controlling terminal needs to upscale the resolution. Preferably, an actual resolution is determined with an agreement between the application programs 11 and 21, and can be dynamically changed by a user.

2) Frame rate: Upon the acceptable frame rate for windows operation, 30, 20 or 10 fps (frame per second) is applicable.

3) Compression: Assuming that original image data is in a format of R, G, B each in 8 bits, according to CPU computation complexities, the compression is divided into: 1) C0=uncompressed (RGB888); 2) C1=run-length (lossless), and the original image data is processed by run-length encoding; 3) C2=delta with run-length (lossless), which is similar to I-P frame, where a difference of the P frame from the I frame is processed by run-length encoding and I:P is 1:30/20/10; 4) C3=color-reduction & delta with run-length (lossy), in which RGB888 is converted to RGB565 (by selecting the most significant bits (MSB)) and compressed by the C2 method; and 5) C4=JPEG (lossy), in which RGB888 is converted to YUV420 and then processed by discrete cosine transform (DCT), quantization and entropy coding.

The three properties above render a total of 1×3×5=15 feasible transmission profiles. From the feasible profiles, the application programs 11 and 21 determine with an agreement for an initial transmission profile according to the feature information corresponding to the first electronic apparatus 1 and the second electronic apparatus 2 stored in the buffers 14 and 24, to accordingly perform image data transmission.

4. Feature Information Determination

As previously described with reference to FIG. 5, the application programs 11 and 21 determine with an agreement for the initial transmission profile according to the feature information corresponding to the electronic apparatuses 1 and 2 stored in the buffers 14 and 24. It should be noted that two sets of feature information corresponding to the electronic apparatuses 1 and 2 are available. In response to a symmetrical architecture of the transmission apparatus of the present invention, the smaller of the two sets of feature information is selected, with implementation details described as below.

1) CPU computation capability: Assuming that the first electronic apparatus 1 is a Ua level and the second electronic apparatus 2 is a Ub level, it is determined that the level $Ux=\min(Ua, Ub)$, (a, b=0~2).

2) Transmission interface capability: When the transmission interfaces of both of the electronic apparatuses are USB3.0, it is determined that the mode Mx=USB3.0, or else it is determined that the Mx=USB2.0.

3) Resolution of physical display device: When the controlled terminal (the first electronic apparatus 1) has a resolution Ra and the controlling terminal (the second electronic apparatus 2) has a resolution Rb, the following steps are performed. In step (a), when Ra<Rb (height/width both match), it is determined that the resolution Rx=Ra, or else step (b) is performed. In step (b), Ra is downscaled to ¼ (downscaling both height/width by ½), and step (a) is repeated.

5. Auto-Selection of Initial Transmission Profile

As previously described with reference to FIG. 5, the application programs 11 and 21 determine with an agreement for the initial transmission profile according to the feature information corresponding to the electronic apparatuses 1 and 2 stored in the buffers 14 and 24. After determining the feature information, implementation details for the initial transmission profile as the coefficient of the determined feature information are: initial transmission profile $Pn=f(Ux, Mx, Rx)$, where n=0~14 (respectively corresponding to the 15 profiles described in the transmission profile properties in Section 3).

6. Transmission Utilization Rate Detection

The transmission utilization rate detection is a mechanism for scheduling packet transmission on the transmission interfaces of the electronic apparatuses to be considered, as described with reference to FIG. 6, when the application programs 11 and 21 need to periodically inquire the transmission controller 30 by a predetermined packet and determine the utilization rates A and B according to the response time of the transmission controller 30. For USB2.0, a token descriptor (TD) of a transmitted and process instruction packet can be reached within one uframe (125 μs). Therefore, an average value of a moving window within a certain period is used to reduce affects of instantaneous discrepancy, with details given as below. 1) The utilization rate A is $UTa=(1/w) \Sigma (i, j)Ta(x)$, where Ta(x) is a response time sequence of an instruction packet of the transmission controller 30 inquired by the application program 11, w is the size of the window, i and j are time sequence indices, and j-i-1-w; 2) the utilization B is $UTb=(1/w) \Sigma (k, 1)Tb(x)$, where Tb(x) is a response time sequence of an instruction packet of the transmission controller 30 inquired by the application program 21, and k and l are time sequence indices, and 1-k-1=w; and C) hence, the total transmission utilization rate $UTx=f(UTa, UTb)$, as a coefficient of the utilization rates A and B.

7. Prioritized Transmission Channel

As described with reference to FIG. 7, the transmission apparatus 3 utilizes transmission channels having different priorities according to types of transmission data (e.g., image transmission, file copying, communication protocols and data sharing). The transmission controller 30 categorizes the transmission interfaces 31 and 32 into several different virtual channels. For example, according to USB specifications, one device has several interfaces, each of which utilizes several endpoints that can be divided into one of the four transfer types—Interrupt, Isochronous, Bulk and Control. Implementation details of the prioritized transmission channels are described below. 1) When the image data transmission utilizes channel0 that is USB interface0, if the image data to be transmitted is compressed image data, the Interrupt transfer type is adopted. The Interrupt transfer type has two endpoints—Interrupt IN and Interrupt OUT. When the image data to be transmitted is uncompressed image data and thus requires a larger bandwidth, the Isochronous transfer type is utilized. The Isochronous transfer type has two endpoints—Isochronous IN and Isochronous OUT. Based on USB2.0 specifications, the Interrupt and Isochronous transfer types are prioritized for access to 80% of the bandwidth on the USB, with the periodic inquiry and transmission carried out at an interval in a unit of one uframe (125 μs) for bandwidth utilization. 2) Other types of data transmission are assigned with channel1 to ChannelN, where N is dependent on the number of types. The Channel1 to ChannelN correspond to USB inteface1 to interfaceN, each of which has two types of endpoints—Bulk In and Bulk OUT.

8. Auto-Dynamic Adjustment on Transmission Profile

By using the transmission channel having the highest priority in the transmission profile (Profile#X) as described with reference to FIG. 7 and dynamically changing the transmission profile according to the overall transmission utilization rate, both overall system performance and user look-and-feel can be attended. The auto-dynamic adjustment on the transmission profile can be implemented as follows: the transmission profile DPn within any time range t is $DPn=f(UTx, Ux, Mx, Rx, t)$, where n=0~14 (respectively corresponding to the 15 profiles described in the transmission profile properties in Section 3), and t is a predetermined period of time (e.g., 5 seconds).

9. Transmission Profile Simplification

Considering implementation complexities and user look-and-feel, with respect to the influence level of transmission profile properties, the frame rate has the highest priority for adjustment (keeping the image quality unchanged), followed by the compression (changing the image quality) and then the resolution (changing the image). A preferred transmission profile can be derived based on the above principle in actual application programs.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A transmission system, for transmitting data between a controlling terminal and a controlled terminal, comprising:

a first electronic apparatus and a second electronic apparatus, having a first application program and a second application program, respectively, for detecting respective corresponding feature information; and a transmission apparatus, coupled to the first electronic apparatus and the second electronic apparatus via a first interface and a second interface, respectively, configured to determine one of the first and second electronic apparatuses as the controlling terminal and one other as the controlled terminal according to respective coupling sequences of the transmission apparatus to the first and second electronic apparatuses;

wherein, the first application program and the second application program determine an initial transmission profile for transmitting the data between the controlled terminal and the controlling terminal according to the feature information; the first application program and the second application program further continue to detect respective transmission utilization rates with the transmission apparatus, and utilize the transmission utilization rates as reference for whether to dynamically adjust a subsequent transmission profile for transmitting the data.

2. The transmission system as claimed in claim 1, wherein the first electronic apparatus further comprises a buffer for storing the corresponding feature information.

3. The transmission system as claimed in claim 2, wherein the corresponding feature information comprises a CPU computation capability, a transmission interface capability and a resolution of a physical display device of the first electronic apparatus.

4. The transmission system as claimed in claim 1, wherein the second electronic apparatus further comprises a buffer for storing the corresponding feature information.

5. The transmission system as claimed in claim 4, wherein the corresponding feature information comprises a CPU computation capability, a transmission interface capability and a resolution of a physical display device of the second electronic apparatus.

6. The transmission system as claimed in claim 1, wherein the initial transmission profile and the subsequent transmission profile comprise resolution, frame rate and compression properties.

7. The transmission system as claimed in claim 1, further comprising a total transmission utilization rate, which is a coefficient of the respective transmission utilization rates and serves as reference for whether to dynamically adjust the subsequent transmission profile.

8. The transmission system as claimed in claim 1, wherein the first interface and the second interface comprise a relatively-high-priority transmission channel and a relatively-low-priority transmission channel; when the data to be transmitted is image data, the data is transmitted via the relatively-high-priority transmission channel.

9. A control method, for a transmission system to transmit data between a controlling terminal and a controlled terminal, the transmission system comprising a first electronic apparatus, a second electronic apparatus and a transmission apparatus; the control method comprising:

the transmission apparatus coupling to the first electronic apparatus and the second electronic apparatus via a first interface and a second interface, respectively, and determining one of the first and second electronic apparatuses as the controlling terminal and one other as the controlled terminal according to respective coupling sequences of the transmission apparatus to the first and second electronic apparatuses;

detecting corresponding feature information of the first and second electronic apparatuses, respectively;

determining an initial transmission profile for transmitting the data between the controlled terminal and the controlling terminal according to the feature information; and continuously detecting respective transmission utilization rates with the transmission apparatus, and utilizing the transmission utilization rates as reference for whether to dynamically adjust a subsequent transmission profile for transmitting the data.

10. The control method as claimed in claim 9, further comprising storing the corresponding feature information in a buffer of the first electronic apparatus.

11. The control method as claimed in claim 10, wherein the corresponding feature information comprises a CPU computation capability, a transmission interface capability and a resolution of a physical display device of the first electronic apparatus.

12. The control method as claimed in claim 9, further comprising storing the corresponding feature information in a buffer of the second electronic apparatus.

13. The control method as claimed in claim 12, wherein the corresponding feature information comprises a CPU computation capability, a transmission interface capability and a resolution of a physical display device of the second electronic apparatus.

14. The control method as claimed in claim 9, wherein the initial transmission profile and the subsequent transmission profile comprise resolution, frame rate and compression properties.

15. The control method as claimed in claim 9, further comprising generating an overall transmission utilization rate serving as reference for whether to dynamically adjust the subsequent transmission profile.

16. The control method as claimed in claim 9, wherein when the first interface and the second interface comprise a relatively-high-priority transmission channel and a relatively-low-priority transmission channel and when the data to be transmitted is image data, further comprising transmitting the image data via the relatively-high-priority transmission channel.

* * * * *